United States Patent [19]
Becquey

[11] Patent Number: 4,780,856
[45] Date of Patent: Oct. 25, 1988

[54] OFF-SHORE SEISMIC PROSPECTION METHOD USING A CODED VIBRATORY SIGNAL AND A DEVICE FOR IMPLEMENTING THIS METHOD

[75] Inventor: Marc Becquey, Rueil Malmaison, France

[73] Assignee: Institut Francais du Petrole, Ruel Malmaison, France

[21] Appl. No.: 924,734

[22] Filed: Oct. 30, 1986

[30] Foreign Application Priority Data

Oct. 30, 1985 [FR] France ................... 85 16266

[51] Int. Cl.⁴ .................. G01V 1/28; G01V 1/22; G01S 9/02
[52] U.S. Cl. ........................... 367/23; 367/39
[58] Field of Search ............ 367/23, 39, 41; 342/145; 375/1

[56] References Cited

U.S. PATENT DOCUMENTS

| | | | |
|---|---|---|---|
| 3,622,970 | 11/1971 | Sayous et al. | 367/23 |
| 4,044,356 | 8/1977 | Fournier | 367/39 |
| 4,168,485 | 9/1979 | Payton et al. | 367/41 |
| 4,297,700 | 10/1981 | Nord et al. | 342/125 |
| 4,606,039 | 8/1986 | Nicolas | 375/96 |

OTHER PUBLICATIONS

Cunningham, A. B.; "Some Alternate Vibrator Signals"; 11/1/78; Geophysics, vol. 44, #12, pp. 1901-1914; see pp. 1907-1913 in particular.

*Primary Examiner*—Nelson Moskowitz
*Attorney, Agent, or Firm*—Antonelli, Terry & Wands

[57] ABSTRACT

An offshore reflection seismic prospection method is provided including a vibratory signal coded in accordance with a pseudo-random code.

Correlation of the signals received by the seismic sensors by means of the cycle of the coded signal transmitted allows seismic plots to be obtained similar to what a pulsed source would provide firing at time intervals equal to the duration of the cycle of the coded signal. Correlation with time shifted cycles reduces the distance between plots recorded on the same sensor. The transmissions coming from two or more vibrators, transmitting the same coded signal with shifted cycles, may be separated by correlation with one of the cycles used.

8 Claims, 4 Drawing Sheets

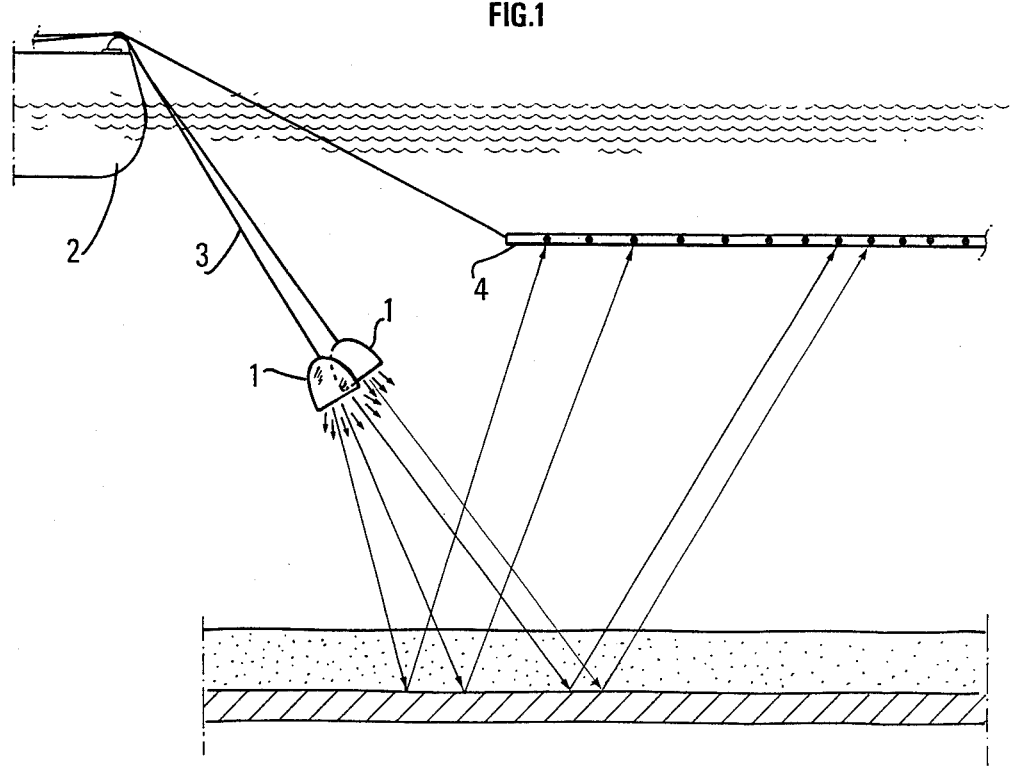
FIG.1
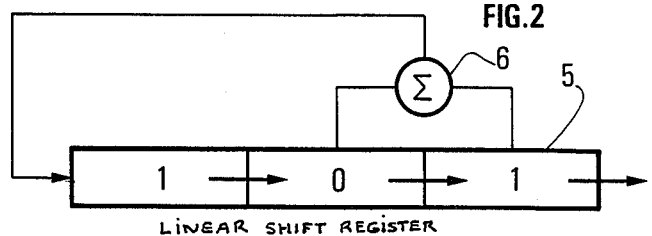
FIG.2
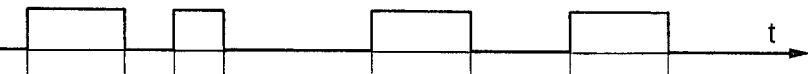
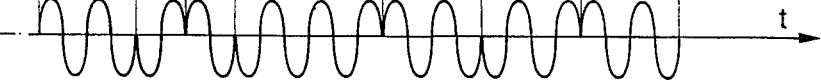

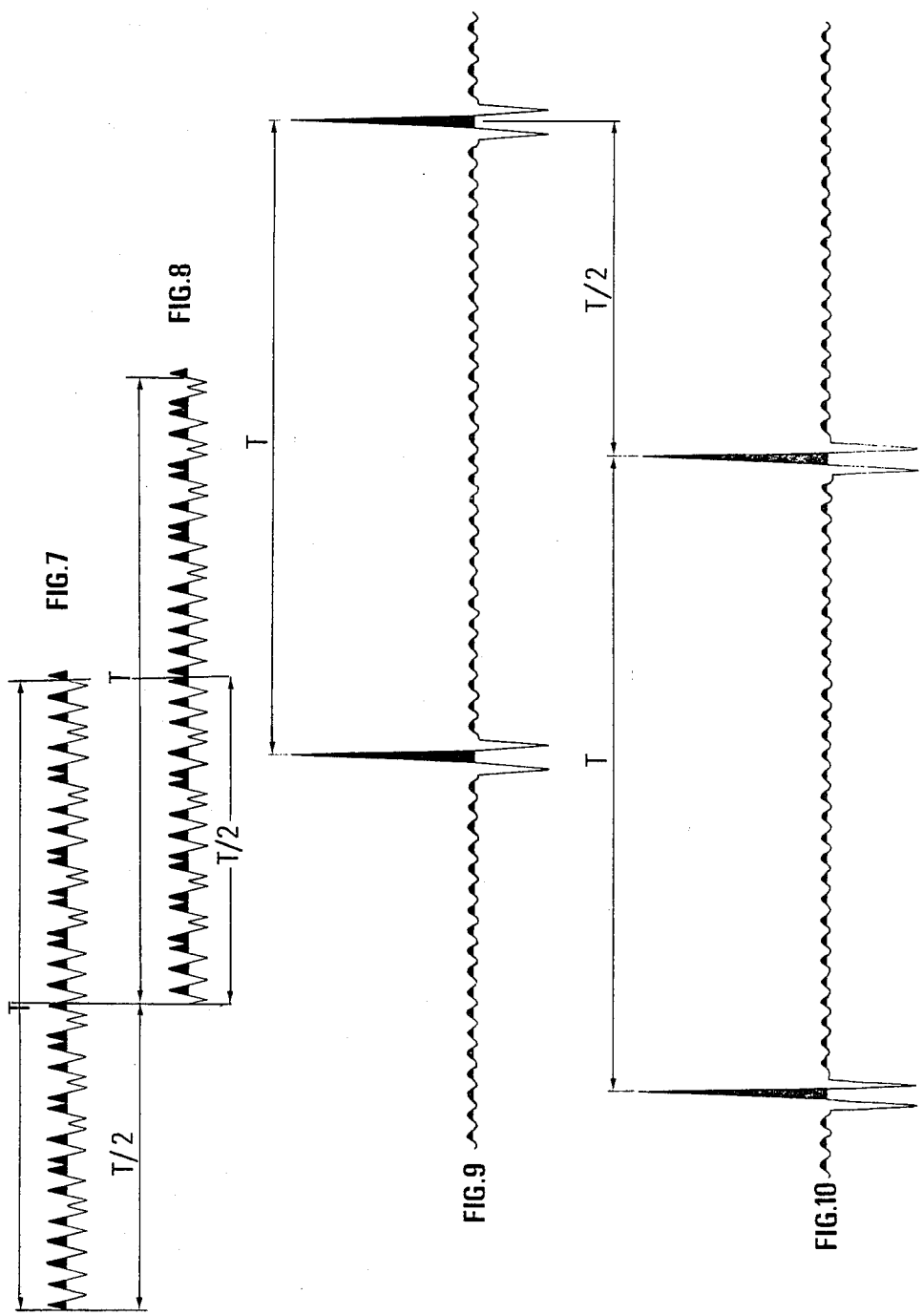

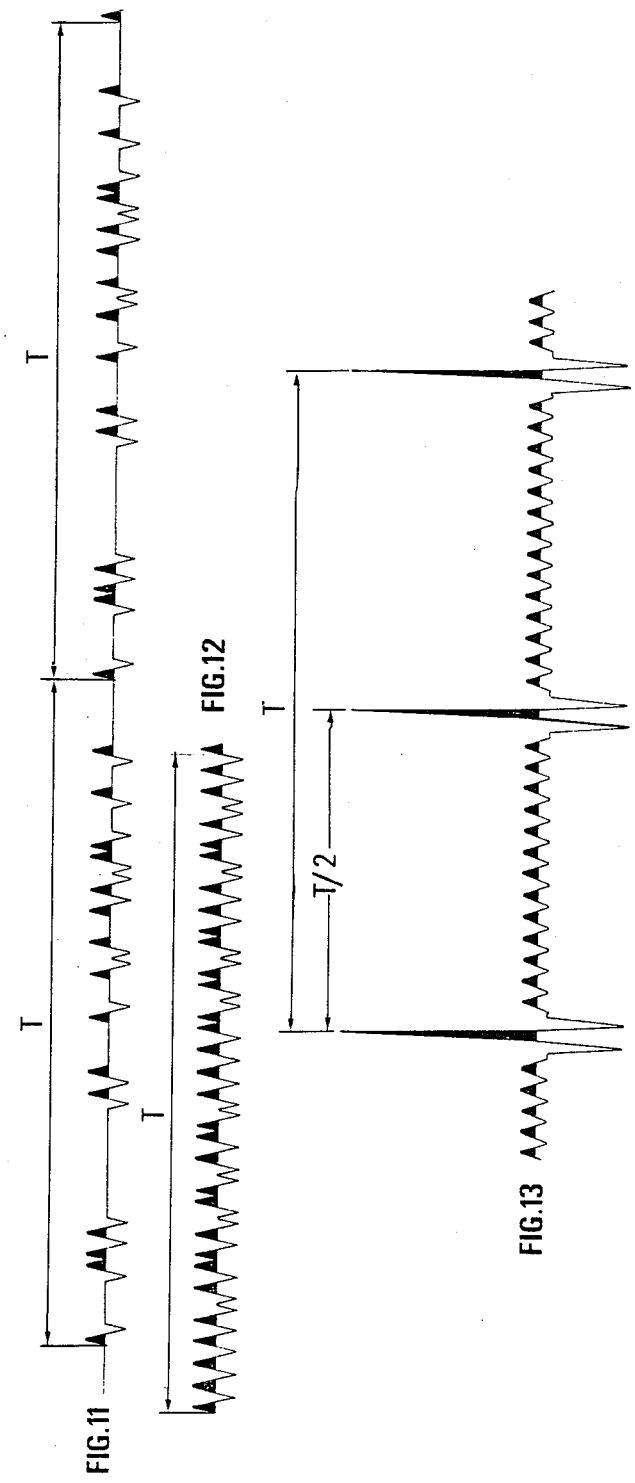

OFF-SHORE SEISMIC PROSPECTION METHOD USING A CODED VIBRATORY SIGNAL AND A DEVICE FOR IMPLEMENTING THIS METHOD

BACKGROUND OF THE INVENTION

1. Field of the Invention

The present invention relates to an off-shore seismic prospection method using one or more vibrators transmitting signals with phase variation.

2. Description of the Prior Art

Land seismic prospection methods are known comprising the transmission in the ground for several seconds of a vibratory signal whose frequency varies continuously inside a frequency band, reception by sensors of the signals reflected by underground reflectors and recording of the signals received. Because of the duration of the transmission, the signals picked up at each moment are combinations of signals reflected back by reflectors situated at very different depths. The image of the different reflectors of the sub-soil can only be found by processing the signals picked up including correlation thereof with the transmitted signals. The result of the processing is identical to that obtained by convoluting the auto-correlation function of the signal transmitted by the succession of the reflection coefficients of the different reflectors. A seismic plot is obtained which is the image of the interfaces between the different geological layers half way between the transmission and reception positions.

Such a method is described for example in the U.S. Pat. No. 2,688,124.

This method has certain drawbacks. The auto-correlation function which is obtained in this case has secondary peaks on each side of the main peak, whose amplitude is not inconsiderable. Furthermore, an interval of time at least equal to the propagation time of the transmitted waves going out to and coming back from the deepest reflector of the explored zone which will be designated by "listening interval" must be provided between two successive transmission sequences, so that the high strength signals picked up at the beginning of the corresponding recording sequence cannot mask the weakest signals coming from more distant reflectors, picked up at the end of the preceding recording sequence. The interruptions required in transmission during a relatively long listening time interval result in limiting the energy transmitted. They are particularly troublesome in offshore seismic prospection where, because of the continued advance of the ship towing the transmission-reception assembly, the difference between the successive positions where the sequences occur is considerable, which limits the spatial resolution of the recordings.

Another method is also known in which, for suppressing the listening time intervals, two signals obtained by linear scanning of the same frequency band are caused to alternate, one in the increasing direction and the other in the decreasing direction. It provides continuous transmission and recording but has the drawback of creating considerable correlation "noise". Such a method is described in the U.S. Pat. No. 3,413,596.

Other known land seismic prospection methods include the use of vibratory sources transmitting signals obtained by modulating a carrier signal by a binary signal or pseudo-random code formed of a sequence of elements able to take on two logic values 0 or 1. The order of succession of these values is chosen so as to have a random character. A logic "1" leaves the sinusoidal signal unchanged. A logic "0" inverts the phase thereof.

The code is of the maximum length type, i.e. any succession of n successive bits can only be repeated identically after a sequence of $(2^n - 1)$ bits. The transmitted signal is formed of a succession of identical cycles whose duration is fixed by the frequency of the carrier signal and by the number of terms of the chosen code. The duration of the signal transmitted is chosen fairly long so as to increase the transmitted energy.

Such methods are described for example in the U.S. Pat. Nos. 3,234,504 or 3,264,606.

The prior methods are adapted to land based seismic prospection where the vibratory source is moved discontinuously from one point to another of a succession of positions in a seismic profile plane to be studied.

Since the seismic source is fixed for each transmission or each transmission sequence, as well as the points of the underground reflectors reflecting the energy which is picked up by the receivers, theoretically no limit is imposed on the transmission duration.

SUMMARY OF THE INVENTION

The method of the invention is adapted to off-shore seismic prospection where the transmission means and the receivers are towed by a ship progressing continuously along a seismic profile to be studied.

It includes the transmission by at least one towed vibratory source of repetitive sequences of acoustic vibrations modulated non repetitively during each of the sequences, reception of the acoustic waves reflected back by the submerged reflectors, recording of the acoustic signals received and processing thereof for determining the position of the reflectors.

It is characterized in that the transmission includes a succession of linked sequences each formed of a periodic carrier signal phase modulated by a pseudo-random binary coded signal of maximum length, and in that processing of the acoustic signals received includes the correlation of the signals received for a period of time equal to the duration of several successive sequences with the coded signals transmitted, so as to obtain correlation peaks at time intervals less than or at most equal to the repetition period of the successive transmission sequences, which, by chopping up the composite signal resulting from the correlation into parts of the same length as each sequence, provides plots corresponding to that resulting from regularly spaced apart isolated bursts, to which conventional multiple coverage processing may be applied.

In a first embodiment, there is only a single vibratory source, the correlation being provided between the signals received and alternately a sequence of transmitted signals and the same sequence of signals shifted in time by an interval less than the repetition period of the sequences. For example, a shift equal to half the repetition period of the sequences of the transmitted signals is chosen.

In another embodiment, at least two vibratory sources are used transmitting simultaneously, the succession of the sequences of signals transmitted by one of the sources being the same as that transmitted by the other but shifted in time and a correlation is established between the signals received resulting from the signals transmitted simultaneously by the sources and the sequence of coded signals transmitted by one or other of the two vibratory sources, so as to obtain alternately correlation peaks corresponding to one or other of the vibratory sources.

The method of the invention is advantageous in that:

the correlation noise is particularly low, the amplitude ratio between each main correlation peak and its secondary peaks being equal to the number of terms of the code and this for practically the whole duration of the composite signal resulting from the correlation, except at the end for a time equal to the length of the sequence which is negligible considering the fairly long duration of the signals received selected for obtaining the composite signal, transmission and recording are carried out without interruption. It follows that the energy transmission is optimum and that the time interval between the successive recording plots may be reduced to the listening time, the form of the correlation peaks which plays the same role as the signature of a pulsed source is known and repetitive, which provides improved efficiency of certain processing operations, particularly multiple coverage, the spectrum of the transmission is better adapted than the linear frequency scanning of prior methods, to the transmission possibilities of offshore vibrators, generally not very efficient at low frequencies, the cyclic character of the pseudo-random codes and their possibilities of permutation which will be explained further on allow, through correlations between the recordings and shifted sequences, intermediate plots to be obtained and thus the spatial resolution of the restored seismic profile to be improved, the interplot being able to be reduced to less than half the distance travelled by the ship during the listening time, and the use of at least two sources transmitting simultaneously signals obtained with shifted codes, allows the recordings corresponding to each of them to be separated.

BRIEF DESCRIPTION OF THE DRAWINGS

Other features and advantages of the method and those of an embodiment of the device for putting the method into practice will be clear from reading the following description with reference to the accompanying drawings in which:

FIG. 1 shows schematically a seismic transmission-reception unit towed by a ship, FIG. 2 shows schematically a device for generating a pseudo-random code, FIG. 3 shows a pseudo-random coding signal, FIG. 4 shows a sinusoidal carrier signal phase modulated by the coding signal of FIG. 1, FIGS. 5 and 6 show respectively and schematically a modulated signal sequence and the correlation function obtained when interruptions are provided between the successive transmission cycles, FIGS. 7 and 8 show respectively two transmission sequences shifted with respect to each other by half a period, used for correlation with the signals received, FIGS. 9 and 10 show respectively the arrangement of the main correlation peaks obtained by using the two shifted sequences, FIG. 11 shows signals picked up in response to the simultaneous transmission by two sources of sequences of signals shifted with respect to each other, FIG. 12 shows a sequence of signals transmitted with which the signals received, shown in FIG. 10, are correlated, FIG. 13 shows the succession of correlation peaks resulting from the correlation.

DESCRIPTION OF THE PREFERRED EMBODIMENTS

Figure 5:
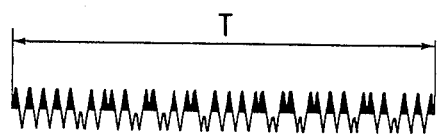

The transmission-reception device includes (FIG. 1) one or more vibratory sources 1 of known type, hydraulic vibrators for example, towed underwater by a ship 2 at the end of a supply cable 3. Each source may include several transducers vibrating in phase. It also includes a reception assembly such as a seismic streamer, also towed under water. Source 1 is fed with a signal formed of a succession of identical transmission cycles, each of them being formed by a coded sinusoidal signal. The coded signals used for modulation are preferably binary sequences of maximum length.

A binary sequence of maximum length is an assembly of $(2^n-1)$ binary "words" to be formed from n bits. These binary words are generated using (FIG. 2) linear shift registers (LSR) 5 having n bits, each able to assume two logic states 1 or 0. In the example shown in FIG. 2 where n is equal to 3, an adder 6 sums together the two most significant bits and applies the result to the input of register 5 causing a shift of its contents. Since the register is initialized at any value different from zero, 101 for example, it can be seen that by successive summations and shifts it displays seven distinct words, this sequence being reproduced identically by continuing the same procedure. The least significant bit of the register will successively display all the binary values of the sequence 1110010 etc.

The binary sequences of maximum length have the following properties:

the number 1 of the binary words is approximately equal to the number of 0s, chopping up of the binary words into segments containing bits of identical value shows that half of them only contain one element, a quarter of them contain 2, an eighth contain 3, etc.

the auto-correlation function of the binary words presents a peak at the outset and decreases very rapidly beyond.

These properties are very close to those of a purely random sequence.

Such a so-called pseudo-random sequence, a particular example of which is shown in FIG. 3, is used for coding a sinusoidal signal (FIG. 4). The phase of the signal is inverted at every passage from a binary value to that which follows it in the coded sequence. The inversion takes place at successive times where the elongation of the vibrator movement is zero so that the vibratory source may follow the movement imposed and consequently each bit of the sequence must code a multiple of the half period of the sinusoidal signal.

It is shown, and this is particularly important, that the ratio of the amplitude of each main peak of the correlation function to that of the secondary peaks which surround it is equal to the number of the elements of the coding sequence.

The coding sequence formed from an n bit register will have 511 elements. If such a sequence is used for modulating a carrier signal of 51 Hz, the duration of each vibratory cycle will be 10 seconds and the ratio of the amplitude of each main peak to that of the corresponding secondary peaks will be equal to 53 dB.

With such a ratio, the main correlation peaks associated with the weak reflected signals received at the end of a recording cycle are not masked by the secondary peaks associated with the strong signals received at the beginning of the next cycle, if the depth of investigation is not too great. Transmission and recording may be carried out continuously.

Figure 6:
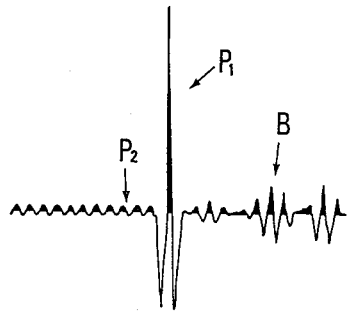
Figure 14:
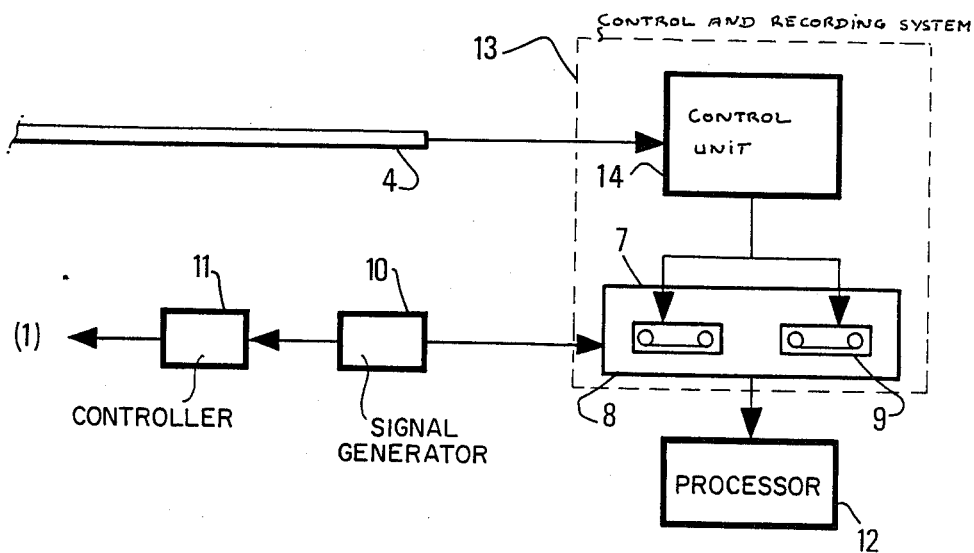
FIG. 14 shows the block diagram of the device for implementing the method.

In FIG. 5 is shown schematically a sinusoidal carrier signal modulated by a pseudo-random code of 31 terms. The ratio of the amplitude of a main peak $P_1$ of the corresponding correlation function (FIG. 6) to the secondary peaks $P_2$ (correlation noise) is equal to 31 when the transmission takes place without interruption. In part B of FIG. 6 can be seen the rise of the correlation noise caused by an interruption in transmission and recording during the duration of a cycle and consequently the degradation of the ratio of the amplitude of each main peak to the correlation "noise" which results therefrom. This example justifies the advantage of uninterrupted transmission and recording made possible both by the continuous advance of the ship and of the transmission-reception assembly along the profile and the use of pseudo-random coding.

In one embodiment of the method, a correlation of the signals received is established with two sequences of signals transmitted of duration T (FIGS. 7,8) which are deductible one from the other by a time shift. The properties of the pseudo-random codes may be used in which two sequences formed from the same code, by effecting a circular permutation in the order of its terms, have the same properties. In the example shown the two sequences are coded by codes having 31 terms shifted with respect to each other by 15 terms. It can be seen that the correlation function obtained with the first sequence (FIG. 9) includes main peaks whose repetition period is T. That obtained with the other sequence (FIG. 10) also includes a series of main peaks succeeding each other with the period T. But the two series obtained are shifted with respect to each other by a time interval which depends on the difference between the two coded sequences used. The resultant series is shown in FIG. 10. In the example shown, the difference is equal to T/2. Of course the information contained in the two intermediate peaks is not independent of that contained in the two adjacent peaks of the resultant series, splitting of the peaks allows results to be obtained similar to the mixing operations performed conventionally by overlapping the successive positions of the transmission-reception device.

The above example, where the shift between the sequences of signals chosen for effecting the correlation is equal to the half period T/2 is not limitative. More generally, the shift is chosen so that the time interval between peaks of the resultant series is less than or equal to the "listening" time, i.e. the maximum propagation time interval of the acoustic waves in the whole zone explored.

In another embodiment, two vibratory sources are used towed by the same ship and offset laterally on each side of its path. The two sources are fed simultaneously with two coded vibratory signals obtained by modulating the same sinusoidal signal by two pseudo-random sequences which are deducted one from the other by a time shift or a circular permutation of their terms. The resultant signal (FIG. 11) received by the reception assembly is the sum of two coded signals similar to the signal shown in FIG. 12 and shifted for example by a half period T. A correlation is established between the resultant signal and the sequence transmitted by one of the two sources. A resultant series of correlation peaks is obtained whose spacing is again equal to T/2 (FIG. 13) which contain alternately information associated with one of the sources and with the other. If the duration of the vibration cycle is at least equal to twice the listening time, the data associated respectively with the two sources may thus be separated during the correlation step, although they operate simultaneously.

The space between the plots corresponds to the advance of the ship during the duration of the vibratory cycle but here again intermediate plots may be re-introduced in each of the restored seismic profiles by correlating the recordings with the sequence transmitted alternately by one and the other vibrator.

The method may be generalized to several vibrators and applications may be found in the field of wide band seismic prospection where the ship tows two vibrators offset laterally by several tens of meters, on each side of the seismic recording streamer, or else in the field of three dimensional seismic prospection.

The device for putting the method into practice is associated with a central control and recording system 13 adapted for collecting sequentially all the seismic data collected by the seismic streamer (FIG. 1) and includes a control unit 14 and a recording unit 7 having at least two tape recorders 8,9 adapted for alternately recording the multiplexed data transmitted to the control unit. Such a system is described for example in the French Pat. No. 2,471,088 relative to a multiplexed seismic streamer. The device also includes a pseudo-random signal generator 10 which delivers its signals, on the one hand, to a member 11 controlling the vibratory source 1 and, on the other, to the recording unit 7. Each recorder 8 or 9 records the signals transmitted and received during a series m of successive transmission-reception cycles. Alternation of the recordings takes place with an overlap of a cycle, i.e. the last cycle of a series is recorded by the two recorders.

The recorded data will be applied in a subsequent step to a processor 12 adapted for reconstituting the seismic plots obtained along the profile explored then are correlated with the pseudo-random sequences transmitted, in accordance with the method of the invention. The correlations are effected by the processor suitably programmed for this purpose.

What is claimed is:

1. A marine seismic prospection method including transmission, by at least one vibratory source towed by a ship moving continuously in a profile plane to be studied, of repetitive sequences of acoustic vibrations modulated non-repetitively during each of said sequences reception of the acoustic waves reflected back by the reflectors, recording of acoustic signals corresponding to the received acoustic waves received and processing said signals so as to determine the position of said reflectors, wherein the transmission includes a succession of linked sequences each formed of a periodic carrier signal phase modulated by a pseudo-random binary coded signal and the processing of the acoustic signals received includes correlation of the signals received during a time equal to that of several successive sequence time periods with a single sequence of coded signals, so as to obtain correlation peaks at time intervals less than or equal to the repetition period of the successive transmission sequences.

2. The method as claimed in claim 1, wherein the two sequences used for the correlation are shifted with respect to each other by a time interval less than the maximum duration of propagation of the acoustic waves in the zone to be explored.

3. The method as claimed in claim 1, wherein the time shift between the two sequences used for the correlation is equal to half the repetition period of the sequences of signals transmitted.

4. The device as claimed in claim 7, wherein the vibration generating means includes two vibrators offset laterally with respect to the path of the ship.

5. A marine seismic prospection method including transmission, by a single vibratory source towed by a ship moving continuously in a profile plane to be studied, of repetitive sequences of acoustic vibrations modulated non-repetitively during each of said sequences, reception of the acoustic waves reflected back by the reflectors, recording of acoustic signals corresponding to the received acoustic waves and processing said signals so as to determine the position of said reflectors, wherein the transmission includes a succession of linked sequences each formed of a periodic carrier signal phase modulated by a pseudo-random binary coded signal and the processing of the acoustic signals received includes correlation of the signals received during a time equal to that of several successive sequence time periods alternately with a single sequence of coded signals and with the same sequence shifted in time by an interval less than the repetition period of the transmitted sequence, so as to obtain correlation peaks at time intervals less than or equal to the repetition period of the successive transmission sequences.

6. A marine seismic prospection method including simultaneously transmitting, by at least two vibratory sources towed by a ship moving continuously in a profile plane to be studied, of repetitive sequences of acoustic vibrations modulated non-repetitively during each of said sequences, reception of the acoustic waves reflected back by the reflectors, recording of acoustic signals corresponding to the received acoustic waves and processing said signals so as to determine the position of said reflectors, wherein the transmission includes a succession of linked sequences each formed of a periodic carrier signal phase modulated by a pseudo-random binary coded signal the succession, of sequences of signals transmitted by one of said vibratory sources being the same as that transmitted by the other one, but shifted in time, and said processing comprising correlation between the received signals resulting from the simultaneous transmission of the two sources and the sequence of coded signals transmitted by one or other of the two vibratory sources so as to obtain alternately correlation peaks corresponding to the first and second vibratory sources.

7. An offshore seismic prospection method including simultaneously transmitting, by at least two vibratory sources towed by a ship moving continuously in a profile plane to be studied, of repetitive sequences of acoustic vibrations modulated non-repetitively during each of said sequences, reception of the acoustic waves reflected back by the reflectors, recording of the acoustic signals received and processing thereof so as to determine the position of said reflectors, wherein the transmission includes a succession of linked sequences each formed of a periodic carrier signal phase modulated by a pseudo-random binary coded signal, the succession of sequences of signals transmitted by one of said vibratory sources being the same as that transmitted by the other one but shifted in time, and said processing comprising correlation between the received signals resulting from the simultaneous transmission of the two sources and, alternately, the sequence of coded signals transmitted by one or other of the two vibratory sources, so as to obtain alternately correlation peaks corresponding to the first and to the second vibratory sources.

8. A marine seismic prospection device including vibrating means towed by a ship for generating vibrations in water, a central control and recording system, a seismic streamer also towed by said ship and provided with an assembly of seismic receivers and a multiplexed transmission system for transmission of signals received by said seismic receivers to said central control and recording system which comprises a generator for generating a carrier wave repetitively phase modulated by sequences of a binary pseudo-random coded signal and applying said phase modulated carrier wave to said vibrating means, and two recording means for recording each of the received signals corresponding to a predetermined number of said sequences, a fraction of said received signals being recorded at the same time on said two recording means.

* * * * *